(12) United States Patent
Wolff et al.

(10) Patent No.: US 10,258,978 B2
(45) Date of Patent: Apr. 16, 2019

(54) MULTILAYER COATED PARTICLE FILTER

(71) Applicant: DINEX A/S, Middelfart (DK)

(72) Inventors: Thomas Wolff, Münchberg (DE);
Ramona Deinlein, Bayreuth (DE);
Lars Christian Larsen, Middelfart (DK)

(73) Assignee: DINEX A/S, Middelfart (DK)

( * ) Notice: Subject to any disclaimer, the term of this patent is extended or adjusted under 35 U.S.C. 154(b) by 0 days.

(21) Appl. No.: 14/911,897

(22) PCT Filed: Aug. 14, 2014

(86) PCT No.: PCT/EP2014/067412
§ 371 (c)(1),
(2) Date: Feb. 12, 2016

(87) PCT Pub. No.: WO2015/022399
PCT Pub. Date: Feb. 19, 2015

(65) Prior Publication Data
US 2016/0193597 A1 Jul. 7, 2016

(30) Foreign Application Priority Data

Aug. 14, 2013 (EP) .................................... 13180493

(51) Int. Cl.
*B01J 23/20* (2006.01)
*B01J 23/22* (2006.01)
(Continued)

(52) U.S. Cl.
CPC ...... *B01J 37/0244* (2013.01); *B01D 53/9418* (2013.01); *B01J 23/20* (2013.01);
(Continued)

(58) Field of Classification Search
None
See application file for complete search history.

(56) References Cited

U.S. PATENT DOCUMENTS

2003/0108465 A1* 6/2003 Voss .................. B01D 53/9454
423/213.2
2006/0057046 A1 3/2006 Punke
(Continued)

FOREIGN PATENT DOCUMENTS

DE 10 2007 039248 A1 2/2009
EP 1 398 081 A1 3/2004
(Continued)

OTHER PUBLICATIONS

International Search Report issued in corresponding PCT/EP2014/067412 dated May 15, 2015; 6pgs.

*Primary Examiner* — Colin W. Slifka
(74) *Attorney, Agent, or Firm* — Maier & Maier, PLLC

(57) ABSTRACT

A porous ceramic substrate for use as a particle filter, with a porosity of at least 50%, which includes a non-uniform coating layer of an oxide component in contact with a surface of the ceramic substrate, which oxide component is distributed on the surface and in dead-end pores of the ceramic substrate and creates the non-uniform coating layer on the substrate support, wherein the coating layer has a substantially smooth surface. Such substrate is typically a particle filter or part of a particle filter, e.g. a DPF.

15 Claims, 9 Drawing Sheets

(51) Int. Cl.
  *B01J 27/224* (2006.01)
  *B01J 29/46* (2006.01)
  *B01J 29/76* (2006.01)
  *B01J 35/00* (2006.01)
  *B01J 35/04* (2006.01)
  *B01J 37/02* (2006.01)
  *B01J 23/44* (2006.01)
  *B01J 29/70* (2006.01)
  *B01D 53/94* (2006.01)

(52) U.S. Cl.
  CPC ............. B01J 23/22 (2013.01); B01J 23/44 (2013.01); B01J 27/224 (2013.01); B01J 29/46 (2013.01); B01J 29/7019 (2013.01); B01J 29/7615 (2013.01); B01J 35/0006 (2013.01); B01J 35/04 (2013.01); B01J 37/0246 (2013.01); *B01D 2255/206* (2013.01); *B01D 2255/20707* (2013.01); *B01D 2255/20723* (2013.01); *B01D 2255/20776* (2013.01); *B01D 2255/407* (2013.01); *B01D 2255/50* (2013.01); *B01D 2255/502* (2013.01); *B01D 2255/504* (2013.01); *B01D 2255/9022* (2013.01); *B01D 2255/9155* (2013.01); *B01D 2255/9205* (2013.01)

(56) References Cited

U.S. PATENT DOCUMENTS

| | | | |
|---|---|---|---|
| 2006/0075742 A1* | 4/2006 | Lee | F01N 3/2066 60/286 |
| 2007/0104623 A1 | 5/2007 | Dettling | |
| 2007/0238605 A1 | 10/2007 | Strehlau | |
| 2008/0045405 A1* | 2/2008 | Beutel | B01J 23/44 502/103 |
| 2011/0185711 A1 | 8/2011 | Mey | |
| 2013/0111876 A1 | 5/2013 | Qi | |

FOREIGN PATENT DOCUMENTS

| | | |
|---|---|---|
| WO | 2012/168277 A1 | 12/2012 |
| WO | 2013/028575 A1 | 2/2013 |

* cited by examiner

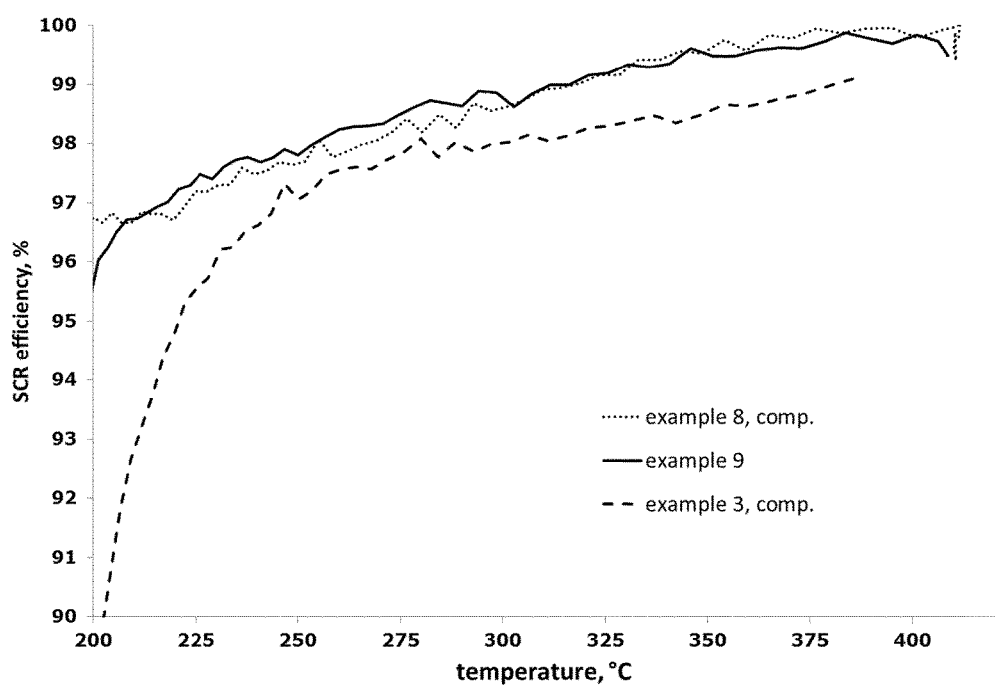

MULTILAYER COATED PARTICLE FILTER

FIELD OF THE INVENTION

The present invention relates to a porous ceramic substrate with mechanical reinforcement for use as a particle filter, a porous ceramic substrate with SCR catalyst for use as a particle filter, a porous ceramic honeycomb filter comprising the porous ceramic substrate, a system for purifying exhaust gasses selected from an exhaust and emission system having a porous ceramic honeycomb filter comprising the porous ceramic substrate, and process of making the porous ceramic substrates.

BACKGROUND OF THE INVENTION

A diesel particle filter (DPF) is normally coated with a catalyst, which has the function to oxidize the accumulated soot but also to oxidize carbon monoxide (CO) and hydrocarbon (HC). If the loading level of the catalyst in the filter is high enough, the functionality of the upstream positioned diesel oxidation catalyst (DOC) can be integrated into the DPF.

To save space and costs and to improve the efficiency of the whole system, the integration of the selective catalytic reduction (SCR) catalyst into the DPF or even a part of the SCR functionality into the DPF is of great interest. SCR is the reduction of NO and $NO_2$ with $NH_3$ to water and nitrogen according to the following three reactions:

$$4NH_3+4NO+O_2 \rightarrow 4N_2+6H_2O \text{ ("Standard SCR")}$$

$$2NH_3+NO+NO_2 \rightarrow 2N_2+3H_2O \text{ ("Fast SCR")}$$

$$8NH_3+6NO_2 \rightarrow 7N_2+12H_2O \text{ ("NO}_2\text{SCR")}$$

In the SAE paper SAE 2011-01-1312 a filter with integrated SCR catalyst is described. It is used in combination with additional SCR modules and compared to the corresponding system, where the DPF and the SCR catalyst are separated. The document shows that the system with the combined SCR-DPF has a better performance. In another paper, the SAE 2011-01-1140, a development of a SCR-DPF based on a copper zeolite coated on a cordierite DPF is described. The most important information from this paper is that the soot load level for the SCR-DPF for crack occurrence is 6.8 g/l for the cordierite at a porosity level of 59%. The substrate will survive this soot load but the corresponding temperature inside the filter is >1000° C. and this has an impact on the zeolite.

An example for a wall flow filter which comprises a SCR catalytic active coating inside of its cell walls is given in the WO2011128026A1. In this application a Fe-zeolite coating of about 100 g/l is described and the characteristic feature of the product is that a second over coating is applied on the inlet side of the channels, which reduces deep bed filtration of the soot.

The US2011268635A1 describes another version of a wall flow filter based on a matrix of nonwoven inorganic fibers. This matrix contains a metal exchanged chabazite molecular sieve as the SCR catalyst.

A wall flow filter, where the SCR catalyst is located as a layer on the surface of the outlet channels and a catalyst for oxidizing particulate matter (PM) is located as a layer on the inlet channels, is described in the US2010287915A1. In this solution the two catalytic active coating layers are separated by the cell wall of the DPF.

A catalytic article, which comprises a monolithic wall flow filter, which contain a SCR catalyst composition that permeates the walls at a loading of 1.3 $g/in^3$ is described in the EP 1 663 458 B1.

In the WO2012135871A1 a multifunctional or multicoated wall flow filter is described, which contains all type of coatings: hydrolysis catalyst, SCR catalyst, ammonia oxidation catalyst and oxidation catalyst. The hydrolysis catalyst is located on the inlet side and the oxidation catalyst on the outlet side, both separated by the cell wall of the filter which contains a SCR catalyst. According to the teaching of this document, the separation of the different catalyst types into the different zones is necessary.

A special SCR catalyst composition is described in the WO2013060487A1, where a mixture of zeolite based catalysts with powders based on Ce—$Mn/Al_2O_3$ or $CeO_2$—$ZrO_2$ are used to form SCR catalysts. This solution describes how the amount of expensive zeolites in a catalyst composition can be reduced by replacing the corresponding volume by these special metal oxides. A similar solution is also described in the patent application US2009304566A1 and also in the WO2008085280A2. All three documents describe a special type of SCR catalyst composition, which can be used on different types of catalyst supports.

A matrix built up by a zeolite based catalyst powder, γ-alumina powder, alumina fibers and an alumina sol as the binder for these components is described in the document EP2123355A1. The big disadvantage is, that it is not possible, to make a diesel particle filter based on this composition, because the high amount of alumina produces a high coefficient of thermal expansion and a low thermal conductivity which makes a save regeneration of soot in the filter impossible.

In general, the filter substrates for exhaust gas after treatment systems as described above due to the state of the art have to be highly porous to receive high wash coat loadings. The high porosity levels lead inevitably to very fragile structures, which cause problems in the canning process. It is therefore necessary to find a possibility to reinforce the porous structure before the coating with the functional catalyst, such as SCR catalyst.

To achieve sufficient catalytic activity in respect to the reduction of all 4 components (particle number (PN), carbon monoxide (CO), hydrocarbon (HC) and nitrogenoxides ($NO_x$)) it is necessary to have enough catalyst or catalytic active contact surface in the filter, and this for different type of catalysts. It is therefore necessary to have all type of catalysts distributed homogeneously over the whole filter volume. At the same time, the overall back pressure of the filter should not exceed the value of corresponding conventional filters at lower porosity levels and low catalyst loading levels. All this leads to a restriction for the amount of each type of catalyst, which is coated on the filter.

All the solutions described in the state of the art are focused on after treatment systems which are operating with passive regeneration. But passive operating systems can also run into situations with a slight soot overload and then at higher exhaust gas temperatures this can end up in temperature peaks inside the filter which are not severe for the substrate but for the catalyst. All known SCR catalysts have a temperature restriction of maximum 750° C. In addition to this in the off-road sector there exist applications with the need of active regeneration. It can therefore be beneficial to use a substrate which can buffer this type of temperature peaks.

SUMMARY OF THE INVENTION

It is the object of the present invention to create a novel type of a multilayer coated particle filter, in particular a DPF, with the following characteristic features:
- High mechanical strength
- High PN efficiency of >99.9% at low back pressure
- Catalytic activity in respect to
  - a reduction of $NO_x$ by SCR
  - a and optionally also soot, HC and CO oxidation The inventors have realized that high mechanical strength for a porous ceramic substrate for use as a particle filter is achieved by applying a coating layer containing an oxide component so that the oxide component is distributed in the dead-end pores of a ceramic substrate.

Thus, in a first aspect the present invention provides a porous ceramic substrate for use as a particle filter, with a porosity of at least 50% v/v, which further comprises a non-uniform coating layer of an oxide component in contact with a surface of the ceramic substrate, which oxide component is distributed on the surface and in dead-end pores of the ceramic substrate and creates the non-uniform coating layer on the substrate, wherein the coating layer has a substantially smooth surface.

Thus, the coating with the oxide component leads to increase of mechanical strength, which is compressive strength and bending strength. Furthermore this oxide component coating layer leads to no impact on mean pore diameter and a low impact on the porosity of the ceramic structure. Hereafter, the oxide component coating level can be increased until a significant change in the porosity can be seen. This leads to further increase in mechanical strength, further reduction in porosity but still no significant impact on pore diameter, and increase of PN reduction efficiency due to decrease in porosity.

The inventors have furthermore realized that by using this first coated ceramic substrate as basis for applying the catalyst, such as SCR catalyst, a high catalyst performance in respect to reduction of $NO_x$, at lower catalyst coating levels could be obtained and moreover the present invention also have an advantage in respect to catalyst costs and also in respect to high PN efficiency at low back pressure.

Accordingly, in a second aspect the present invention relates to a porous ceramic substrate for use as a particle filter with a porosity of at least 50% v/v, which further comprises a) a first non-uniform coating layer of an oxide component in contact with a surface of the ceramic substrate, which oxide component is distributed on the surface and in dead-end pores of the ceramic substrate and creates the non-uniform coating layer on the substrate, wherein the first coating layer has a substantially smooth surface and b) a second coating layer of a catalytic active material in direct contact with the smooth surface of the first coating layer.

Further advantages of the second coating layer distributed on the smooth surface of the first coating layer are seen when using SiC or SiN or mixtures thereof as the ceramic substrate material, in particular high thermoshock resistance for potential active soot regeneration and ability to buffer temperature peaks during active regeneration.

In a further aspect the present invention relates to a porous ceramic substrate comprising a porous substrate support with a porosity of at least 50% v/v, wherein the porosity is measured by mercury intrusion porosimetry according to DIN 66133, which support further comprises a non-uniform coating layer of an oxide component, which oxide component is distributed on the surface of the substrate support and in dead-end pores of the substrate support and creates the non-uniform coating layer on the substrate support, wherein the coating layer has a substantially smooth surface. Typically, the oxide component is selected from the group consisting of alumina, titania, silica, ceria, zirconia, niobium, praseodymium or mixtures thereof.

In a still further aspect the present invention relates to a porous ceramic substrate comprising a porous substrate support with a porosity of at least 50% v/v, wherein the porosity is measured by mercury intrusion porosimetry according to DIN 66133, which support further comprises a) a first non-uniform coating layer of an oxide component in contact with a surface of the substrate support, which oxide component is distributed on the surface of the substrate support and in dead-end pores of the substrate support and creates the non-uniform coating layer on the substrate support, wherein the first coating layer has a substantially smooth surface and b) a second coating layer of a SCR catalytic active material in direct contact with the smooth surface of the first coating layer. Typically, the oxide component is selected from the group consisting of alumina, titania, silica, ceria, zirconia, niobium, praseodymium or mixtures thereof.

In a further aspect the present invention relates to a system for purifying exhaust gases selected from an exhaust and emission system having a porous ceramic substrate comprising a porous substrate support with a porosity of at least 50% v/v, wherein the porosity is measured by mercury intrusion porosimetry according to DIN 66133, which support further comprises a non-uniform coating layer of an oxide component, which oxide component is distributed on the surface of the substrate support and in dead-end pores of the substrate support and creates the non-uniform coating layer on the substrate support, wherein the coating layer has a substantially smooth surface. Typically, the oxide component is selected from the group consisting of alumina, titania, silica, ceria, zirconia, niobium, praseodymium or mixtures thereof.

In a still further aspect the present invention relates to a system for purifying exhaust gases selected from an exhaust and emission system having a porous ceramic substrate comprising a porous substrate support with a porosity of at least 50% v/v, wherein the porosity is measured by mercury intrusion porosimetry according to DIN 66133, which support further comprises a) a first non-uniform coating layer of an oxide component in contact with a surface of the substrate support, which oxide component is distributed on the surface of the substrate support and in dead-end pores of the substrate support and creates the non-uniform coating layer on the substrate support, wherein the first coating layer has a substantially smooth surface and b) a second coating layer of a SCR catalytic active material in direct contact with the smooth surface of the first coating layer. Typically, the oxide component is selected from the group consisting of alumina, titania, silica, ceria, zirconia, niobium, praseodymium or mixtures thereof.

In a further aspect the present invention relates to a process of making a porous ceramic substrate comprising a porous substrate support with a porosity of at least 50% v/v, wherein the porosity is measured by mercury intrusion porosimetry according to DIN 66133, which support further comprises a non-uniform coating layer of an oxide component, which oxide component is distributed on the surface of the substrate support and in dead-end pores of the substrate support and creates the non-uniform coating layer on the substrate support, wherein the coating layer has a substantially smooth surface, the process comprising a) applying the coating layer of the oxide component in an amount sufficient to create a substantially smooth surface on the substrate support and sufficient to distribute the oxide component in dead-end pores of the substrate support to create the non-uniform coating layer.

In a still further aspect the present invention relates to a process of making a porous ceramic substrate comprising a porous substrate support with a porosity of at least 50% v/v, wherein the porosity is measured by mercury intrusion porosimetry according to DIN 66133 which support further comprises a) a first non-uniform coating layer of an oxide component in contact with a surface of the substrate support, which oxide component is distributed on the surface of the substrate support and in dead-end pores of the substrate support and creates the non-uniform coating layer on the substrate support, wherein the first coating layer has a substantially smooth surface and b) a second coating layer of a SCR catalytic active material in direct contact with the smooth surface of the first coating layer, the process comprising a) applying the first coating layer of the oxide component in an amount sufficient to create a substantially smooth surface on the substrate support and sufficient to distribute the oxide component in dead-end pores of the substrate support to create the non-uniform coating layer, and b) applying the second coating layer of a catalytic active material (SCR catalyst) directly on the smooth surface of the first coating layer in an amount sufficient to obtain a catalytic reductive effect of $NO_x$.

FIGURE LEGENDS

Figure 5:
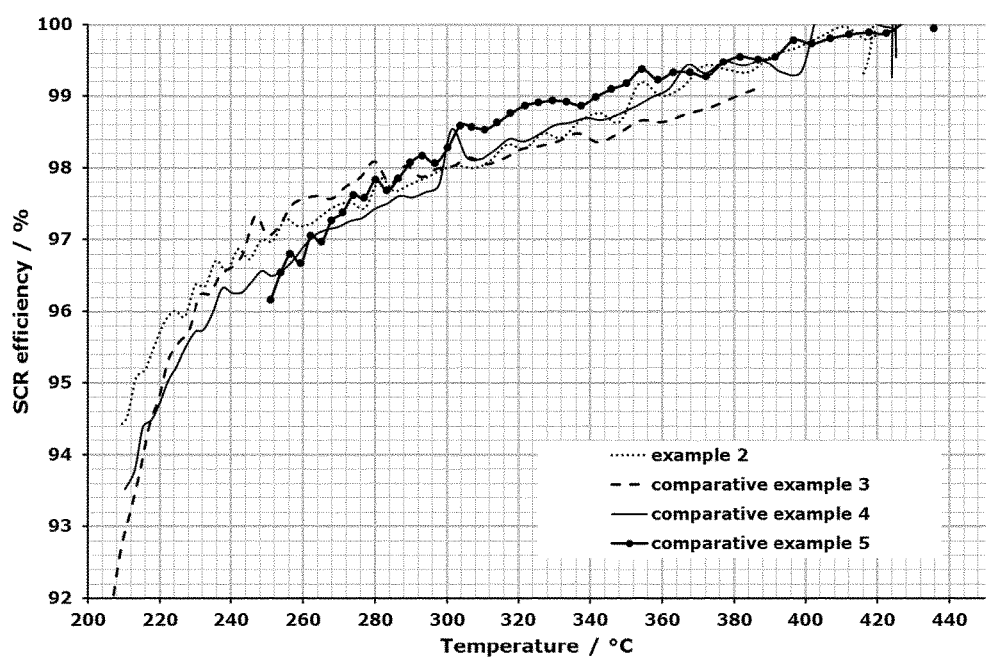

FIG. 5 shows the results for the SCR efficiency in the temperature range from about 200° C. up to about 450° C. for the test samples described in the examples 2-5.

Figure 6:
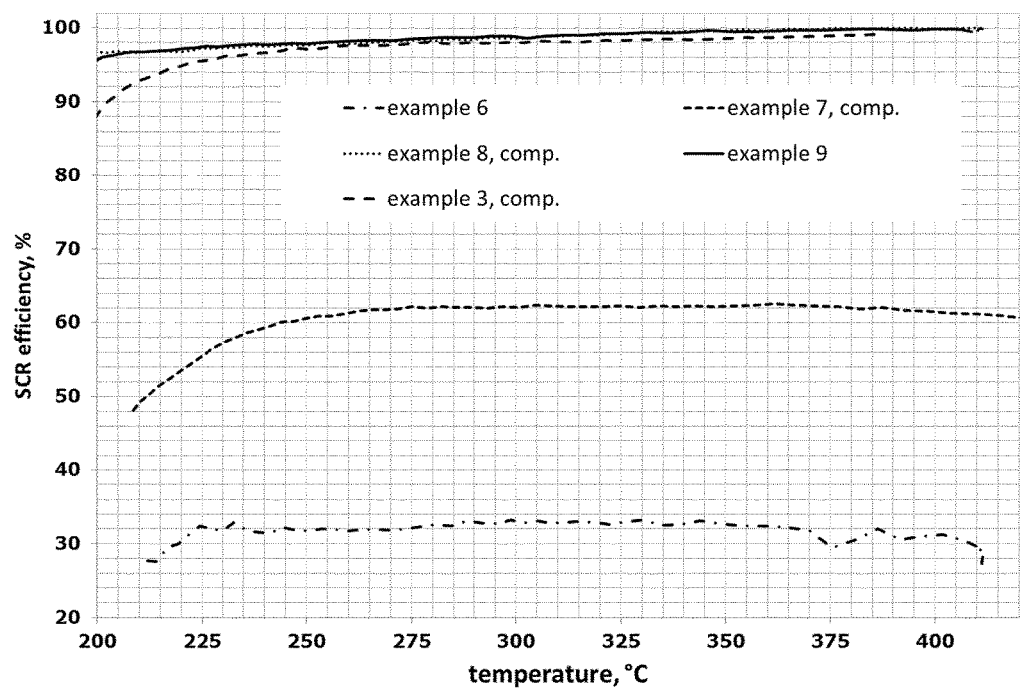

FIG. 6 shows the results for the SCR efficiency in the temperature range from about 200° C. up to about 450° C. for the test samples described in the examples 6-9 and in comparative example 3.

FIG. 6b shows an enlarged portion of FIG. 6.

Figure 7:
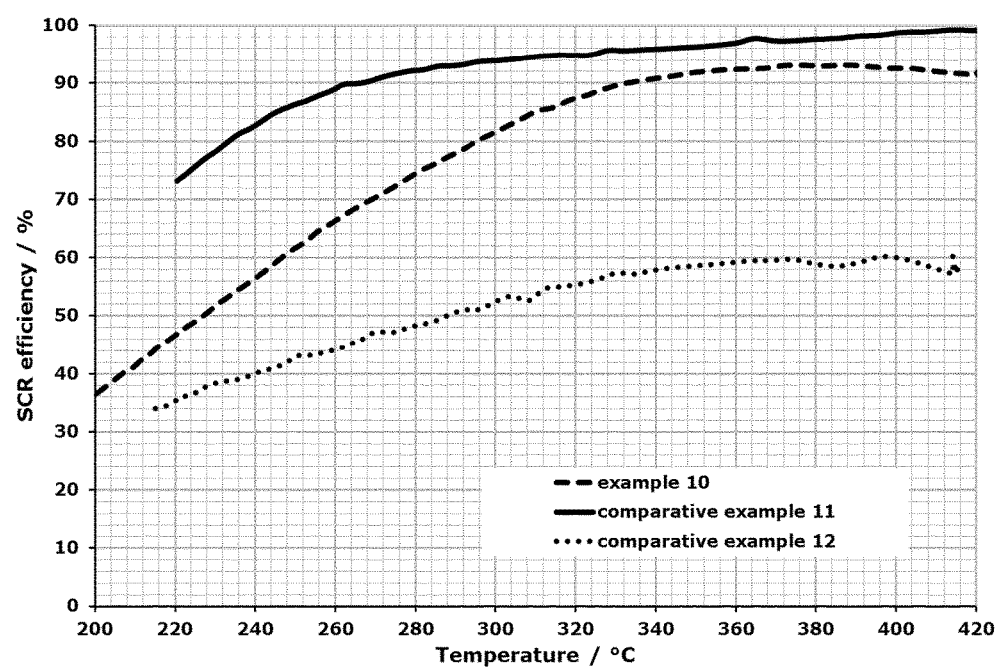

FIG. 7 shows the results for the SCR efficiency in the temperature range from about 200° C. up to about 450° C. for the test samples described in the examples 10-12.

Figure 8:
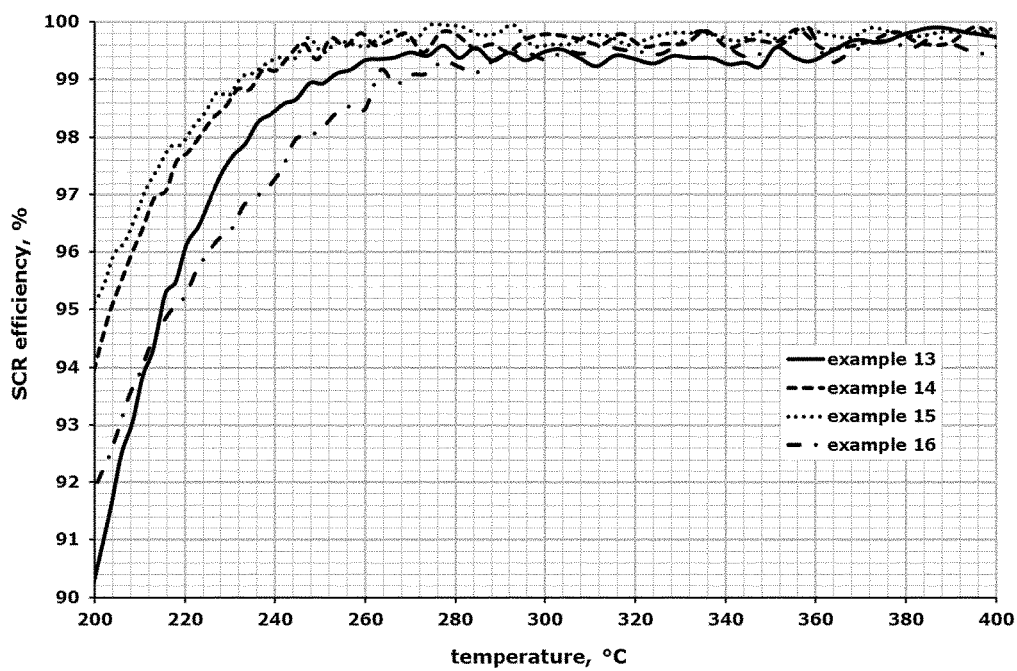

FIG. 8 shows the results for the SCR efficiency in the temperature range from about 200° C. up to about 400° C. for the test samples described in the examples 13-16.

DEFINITIONS

In the present context, the term "a porous substrate support" as used herein means a substrate support with a porosity of at least 50% v/v, having pores and small dead-end pores. Such porosity can be measured by mercury intrusion porosimetry according to DIN 66133. Such ceramic substrate is used to make porous ceramic honey comb filter segments for building filters such as DPF.

In the present context, the term "dead-end pores of the substrate support" as used herein means pores wherein there is one pore opening in the surface of the substrate support so that the pore does not go through the substrate to create two or more openings or connect with other pore channels having at least one opening. These pores are usually very small, i.e. their diameter is below the $D_{95}$ value of the pore diameter which corresponds to the pressure $p_{95}$, which is the pressure for which 95% of the saturated pore volume in the mercury intrusion is pressed into the test sample. $D_{95}$ is calculated by the Washburn equation $$D_{95} = -\frac{4\gamma \cos\theta}{p_{95}}$$

where $\gamma$ is the surface tension of mercury and $\Theta$ the contact angle of 130°. In an embodiment of the present invention the dead-end pores of the substrate support is below the $D_{95}$ value of the pore-volume distribution determined by a mercury intrusion porosimetry according to DIN 66133.

In the present context, the term "a non-uniform coating layer" as used herein means that the initial coating layer comprising the oxide component is distributed in pores and dead-end pores of the substrate support so as to fill-up the dead-end pores and create a smooth layer on the surface of the substrate support. By being distributed in dead-end pores and on the crystals making up the substrate support the coating layer will be non-uniform since the thickness of the coating layer will vary significantly over the surface of the substrate. In accordance with known techniques for SiC an oxide film may be applied to a SiC substrate before applying the coating layer in accordance with the present invention, however, such an oxide film does not fill up the dead-end pores In the present context, the term "an oxide component" as used herein means an oxide component that is able to form nano particles or amorphous substance to be distributed on the surface and in dead-end pores of the substrate support, and is typically selected from a colloidal sol and/or a metal oxide.

In the present context, the term "in direct contact with the smooth surface of the first coating layer" as used herein means that the second coating layer created by the catalyst is formed on the surface of the first coating layer of the oxide component and is in contact therewith without any layer or film being applied in between.

In the present context, the term "a substantially smooth surface" as used herein means that a major part of the surface created by the first coating layer of the oxide component is smooth. Typically, the whole surface created by the first coating layer of the oxide component is smooth, although, minor insignificant parts of the surface may be less smooth.

In the present context, the term "a porous ceramic honeycomb filter" as used herein means a filter for purifying exhaust gasses in which comprises at least one porous ceramic honeycomb filter segment and in the case that it comprises more than one such a segment they are combined with one another through adhesive layers. Each of the porous ceramic honeycomb filter segments comprises a number of through-holes that typically, are placed in parallel with one another in the length direction with partition wall interposed therebetween and wherein the partition walls functions as a filter for collecting particulates. The porous honeycomb filter has its usual meaning as understood by the person skilled in the art, and suitable examples of such filters and how to make such filters are i.a. described in EP0816065, EP1382445, EP1382442, EP1306358, EP1270202, EP1142619, EP1479881, EP1719881, and EP1726796, reference is made in particular to the drawings and description of the drawings.

In the present context, the term "a non-oxide inorganic silicon containing component" as used herein means a component not containing any oxide and containing silicon which builds up the main skeleton of the porous substrate support, such as silicon carbide or silicon nitride or mixtures thereof. The non-oxide silicon containing component may be selected from α-SiC and β-SiC or a mixture thereof, preferably α-SiC. Alternatively, the non-oxide silicon containing component may be selected from $Si_3N_4$. Moreover, the non-oxide silicon containing component may be selected from a mixture of alfa-SiC and $Si_3N_4$.

In the present context, the term "an oxide inorganic silicon containing component" as used herein means a component containing oxide and silicon which builds up the main skeleton of the porous substrate support. The non-oxide silicon containing component may be selected from cordierite or mullite ($Al_6Si_2O_{13}$).

In the present context, the term "a nano particle" as used herein means a particle with a mean particle diameter size in the nano diameter range as known to the skilled person, typically colloidal sols have a particle diameter of 10-50 nm and if a slurry of grinded particles is used, so called nano slurries, it have a $D_{50}$ of about 400 nm and a $D_{90}$ of 600-700 nm. The particle size distributions may be determined using the laser diffraction method as described in the ISO 13320. As used herein the "mean particle diameter size" is intended to means the $D_{50}$ value of the particle size distribution. The $D_{50}$ value specifies the particle diameter, for which 50% of all measured particles are equal or smaller in diameter.

In the present context, the term "amorphous substance" as used herein means a substance which is comprised of particles (atoms, grains, molecules) arranged so that the locations of their centers of mass are disordered, i.e. they do not show any long-range order characteristic.

In the present context, the term "catalytic active" covers and typically means SCR catalytic active.

In the present context, the term "SCR catalytic active" as used herein means a material, which is able to provoke at its surface the reduction of NO and $NO_2$ in presence of $NH_3$ and $O_2$ to $H_2O$ and $N_2$ at a given temperature.

As used herein loading amount in g/l means the amount of the oxide component or the SCR catalytic active material which is coated on the porous substrate support in form of a honeycomb structure. The amount of the coated component is divided by the total geometric volume of the honeycomb, i.e. the sum of all cannel walls and the corresponding channel volumes.

DESCRIPTION OF THE INVENTION

The porous substrate support of the present invention may have a porosity as high as 75% v/v, and typically is between 50% to 75%, in particular 60% to 75%, preferably 65% to 75%. In case of passive regeneration with very low soot loading rate (below 2 g/l) the base material can be an oxide ceramic like cordierite. Passive regeneration means that the soot on the DPF is oxidized at temperatures above 300° C. with the $NO_2$ of the exhaust gas building NO and $CO_2$. To have sufficient $NO_2$ for this process a DOC is positioned upstream of the filter to convert a part of the NO to $NO_2$. If the soot emissions of the engine are low this oxidation keeps the loading on the filter at a constant low level, i.e. the filter is regenerated continuously. In case of passive regeneration with higher soot load levels and especially for all applications with active regeneration the base material should have a high specific heat capacity and a higher thermoshock resistance than cordierite. Active regeneration means that the exhaust temperature will be increased periodically by an active step. This active step can be the injection of diesel fuel in front of the DOC to increase the temperature by the burning of the fuel or the engine is switched to a high load point creating high exhaust temperatures. The preferred materials are silicon carbide or silicon nitride. With both type of substrate support materials porous filters can be made. The mechanical strength of these porous structures will be enhanced by a first coating layer of an oxide component as described herein.

In a further embodiment of the present invention the substrate support comprises mullite or cordierite. In another embodiment of the present invention the substrate support comprises a non-oxide inorganic silicon containing component, such as selected from the group of SiC and $Si_3N_4$. In a particular embodiment the substrate support consists essentially of SiC.

When the substrate support consists of SiC it is preferred to treat it by high temperature oxidation to create a film of silicon oxide. Several SiC may be oxidized to build an oxide film e.g. re-crystallized SiC, reaction formed SiC, silicon bonded SiSiC, liquid phase sintered SiC, Silicon nitride bonded SiC and oxide ceramic bonded SiC. Thus, in one embodiment the porous substrate support is re-crystallized. In another embodiment the porous substrate support is reaction formed SiC. In a further embodiment the porous substrate support is silicon bonded SiSiC. In further embodiments the porous substrate support is liquid phase sintered SiC, Silicon nitride bonded SiC and/or oxide ceramic bonded SiC.

The porous ceramic substrate of the present invention finds use in particular within diesel particle filters which is composed of said ceramic substrate. Thus, in one embodiment the porous ceramic substrate is for use as a DPF.

In a further embodiment of the present invention the oxide component comprises, such as consists of, nano particles. In another embodiment of the present invention the oxide component comprises, such as consists of, amorphous substance. In a further embodiment of the present invention the oxide component comprises, such as consists of, a mixture of nano particles and an amorphous substance or amorphous substances.

In a still further embodiment of the present invention the oxide component is selected from a colloidal sol. In a particular embodiment of the present invention the oxide component is silica. In another particular embodiment of the present invention the oxide component is alumina. In a further particular embodiment of the present invention the oxide component is titania. In a further particular embodiment of the present invention the oxide component is a mixture of at least two of these colloidal sols.

In a further embodiment of the present invention the oxide component is selected from a metal oxide. In a particular embodiment of the present invention the oxide component is alumina. In another particular embodiment of the present invention the oxide component is silica. In a further particular embodiment of the present invention the oxide component is titania. In a further particular embodiment of the present invention the oxide component is a mixture of at least two of these oxides.

In a further embodiment of the present invention the oxide component comprises at least two of the following metal oxides: $CeO_2$, $ZrO_2$, $Al_2O_3$, $SiO_2$, $TiO_2$.

In a still further embodiment of the present invention the oxide component is present in the amount per volume of 20-100 gram oxide component/liter of substrate (g/l). The liter of substrate support means the volume of substrate support as such, including any pores and dead-end pores. In the case where the substrate support is given in form of a honeycomb structure, the volume of the channels is also included.

In a further embodiment of the present invention the oxide component is distributed on at least 50% of the surface of the substrate support. In a particular embodiment of the present invention the oxide component is distributed on at least 80% of the surface of the substrate support. In a further particular embodiment of the present invention the oxide component is distributed on at least 90% of the surface of the substrate support. Typically, the oxide component is distributed on the whole surface of the substrate support.

In a further embodiment of the present invention the substrate support comprises an oxide inorganic silicon containing component, such as mullite or cordierite, or a non-oxide inorganic silicon containing component, such as selected from the group of SiC and $Si_3N_4$. In a particular embodiment of the present invention the substrate support comprises mullite. In another particular embodiment of the present invention the substrate support comprises cordierite. In a further embodiment of the present invention the substrate support comprises SiC, typically the substrate support consists essentially of SiC. In a still further embodiment of the present invention the substrate support comprises $Si_3N_4$.

The particle filter comprising the porous ceramic substrate of the invention is typically a diesel particle filter.

The initial coating layer maybe in the form of an amorphous substance or in the form of nano particles as described above. When the coating layer is given in form of a colloidal sol of nano particles, examples are a silica sol ($SiO_2$), titania sol ($TiO_2$) or an alumina sol ($Al_2O_3$). Sols, also called colloids, are in these special case stable dispersions of fine solid metal oxide particles in a liquid medium, typically water. The particle size is usually submicron down to 1 nm. Such particles are normally invisible to the human eyes yet some of the colloids are not completely translucent but opaque or slightly colored due to the Tyndall effect. In order to avoid agglomeration and/or sedimentation the dispersed particles are either sterically or electrostatically stabilized. Such dispersions are usually produced by a sol-gel method and stable over months or even years if stored at the right conditions.

Sols are used in many thin film applications. Yet also so-called nano slurries might be used for this kind of application. They derive from submicron/nano powders dispersed in e.g. water by using a dispersant. It is important to use materials and particle sizes that are likely to sinter together at medium calcination temperatures to create a smooth layer on top of the ceramic filter substrate. In general for both sols and nano slurries any kind of metal oxides from the group of transition and rare earth metals and mixtures thereof as well as aluminum and silicon oxides might be used.

The sol or nano particles fill up mainly the very fine and small intermediate spaces between the crystals, which build up the structure of the porous lattice (ceramic substrate). This leads to an enforcement of the connections and bridges between the crystals and as a result of that to the increase in mechanical strength. The crystals are covered with a very thin layer of the sol particles resulting in a smoothing of the edges of the crystals. Due to the fact, that mainly the intermediate spaces in the pore walls and any small dead-end pores are filled, the accessible porosity is reduced, but not the main pore diameter.

Due to this effect, the initial coating for achieving higher mechanical strength is hereafter referred to as SEMS, where SEMS stays for "sol enhanced mechanical strength".

This initial sol coating can be modified to have additional functionality. For instance, the specific surface area of the sol layer can be increased by adding particles, and in a further embodiment the particles are selected from $Al_2O_3$, $ZrO_2$, and SiC. Such added particles will not cover and create a coating layer on the sol layer. In another alternative, if hydrolysis functionality is desired, which is useful for the hydrolysis of urea to ammonia in a selective catalytic reaction, then in a further embodiment a titania sol based on titania in the anatase phase is added to the sol layer.

In general all kind of colloidal sols or nano slurries can be used for this purpose. In respect to the type of material of the porous ceramic structure which has to be enhanced in mechanical strength, special combinations are preferred. These are as below but not limited to:

| Porous ceramic | nano particles |
| --- | --- |
| Cordierite | alumina sol |
| Mullite | alumina sol |
| Silicon carbide | silica sol, titania sol |
| Silicon nitride | silica so, titania sol |

Figure 1:
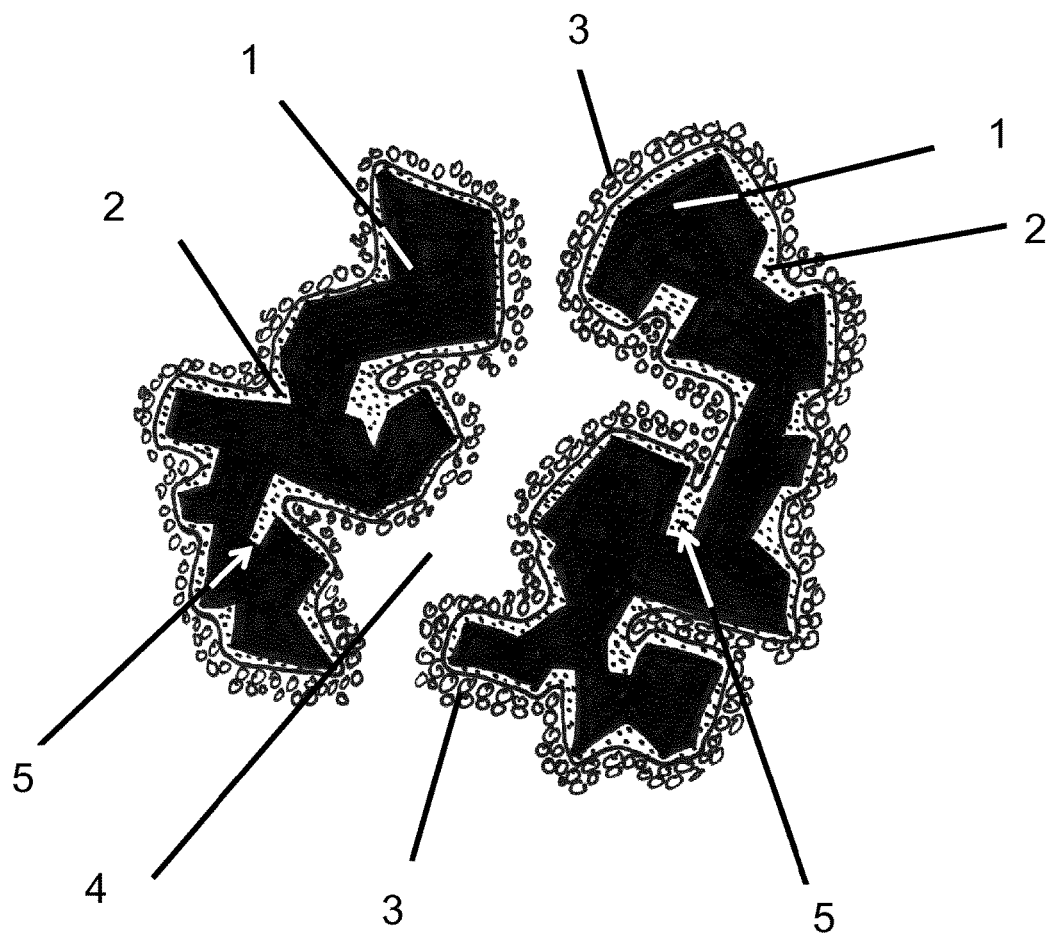
FIG. 1 shows a porous ceramic substrate support with pores and dead-end pores and coating layers applied.

On this initial coating, the active catalyst material is coated. Due to the effect, that this 30 second coating layer is now applied on the smooth surface of the first coating layer without any dead end pores built by the small intermediate spaces between the crystals, the total needed amount for a given catalytic effect can be optimized and lowered in comparison to a solution without the first coating layer. This effect is shown schematically in FIG. 1. The substrate support (1) has pores (4) and dead-end pores (5) and on this substrate support a first non-uniform coating layer (2) is applied which enters into the dead-end pores (5) to fill them up, and this creates the non-uniform layer (2) as the thickness of the coating layer varies. A second coating layer with a catalyst (3) (e.g. SCR catalyst) is then applied to the surface of the first coating layer (2) to provide the porous ceramic substrate to be used in for instance a DPF.

Once the non-uniform coating layer of the oxide component is distributed on the surface and in dead-end pores of the substrate support a second coating layer of catalytic active material is provided directly to the smooth surface of first coating layer.

Thus, in a further embodiment of the present invention the catalytic active material is selected from a SCR catalyst.

In a still further embodiment of the present invention the catalytic active material is selected from the group of unexchanged, partly or completely metal exchanged ZSM-5, beta-, chabazite, ferrierite, mordenite, faujasite zeolites and combinations thereof.

In a further embodiment of the present invention the catalytic active material is selected from the group of mixed metal oxides, such as consisting of at least two metal oxides from the group of transition or rare earth metals and combinations thereof.

In a still further embodiment of the present invention the catalytic active material is selected from the group of vanadium oxide based coatings, such as vanadia, titania-vanadia, titania-tungsta-vanadia, titania-tungsta-rare earth vanadate, titania-silica-tungsta-rare earth vanadates.

In a further embodiment of the present invention the catalytic active material is selected from mixtures of mixed metal oxides and zeolites.

In a still further embodiment of the present invention the catalytic active material is present in an amount of 120 gram catalytic active material/liter of substrate (g/l) or less, such as from 25 to 100 g/l.

The coating layers, that is the first coating layer and the second coating layer can be applied to the substrate support by methods known to the skilled person, such as dip-coating, (incipient wetness) impregnation, CVD, PVD, plasma coating, spray coating, pouring over/powder slurry coating/fill-and-dry-coating, sol gel, deposition, saturation coating, precipitation or thin-film methods.

In a further aspect the present invention relates to a porous ceramic substrate comprising a porous substrate support with a porosity of at least 50% v/v, wherein the porosity is measured by mercury intrusion porosimetry according to DIN 66133, which support further comprises a) a first non-uniform coating layer of an oxide component in contact with a surface of the substrate support, wherein the oxide component is selected from the group consisting of alumina, titania, silica, ceria, zirconia, niobium, praseodymium or mixtures thereof, which oxide component is distributed on the surface of the substrate support and in dead-end pores of the substrate support and creates the non-uniform coating layer on the substrate support, wherein the first coating layer has a substantially smooth surface, b) a second coating layer of a first SCR catalytic active material in direct contact with the smooth surface of the first coating layer, and c) a third coating layer of a second SCR catalytic active material in direct contact with the second coating layer.

In an embodiment the oxide component consists of nano particles, such as nano particles having a mean diameter in the range from 1 nm to 900 nm.

In another embodiment the oxide component is selected from the group consisting of alumina, titania, silica, ceria, zirconia, niobium, praseodymium or mixtures thereof.

In a further embodiment the oxide component is present in the amount per volume of 20-120 g/l, such as 40-100 g/l. In a further embodiment the oxide component is distributed on at least 80% of the surface of the substrate support. Typically, the oxide component is distributed on essentially the whole surface of the substrate support, or on the whole surface of the substrate support.

In a still further embodiment the ceramic substrate support comprises mullite or cordierite or a non-oxide inorganic silicon containing component, such as selected from the group of SiC and $Si_3N_4$.

In a further embodiment the ceramic substrate support consists essentially of SiC.

In a still further embodiment the porosity of the ceramic substrate support is at least 60% v/v, such as at least 65%, and no more than 75%.

In a further embodiment the first SCR catalytic active material is present in an amount of 120 g/l or less, such as from 25-120 g/l, e.g. from 40 to 100 g/l. In another embodiment the second SCR catalytic active material is present in an amount of 120 g/l or less, such as from 25-120 g/l, e.g. from 40 to 100 g/l. Thus, the first SCR catalytic active material may be present in an amount of from 40 to 120 g/l, and the second SCR catalytic active material may be present in an amount of from 40 to 100 g/l.

In a still further embodiment the first SCR catalytic active material is selected from the group of mixed metal oxides as consisting of at least two metal oxides from the group of transition or rare earth metals and combinations thereof and the second SCR catalytic active material is selected from the group of unexchanged, partly or completely metal exchanged ZSM-5, beta-, chabazite, ferrierite, mordenite, faujasite zeolites and combinations thereof.

In a further embodiment the first SCR catalytic active material is selected from the group of vanadium oxide based coatings such as vanadia, titania-vanadia, titania-tungsta-vanadia, titania-tungsta-rare earth vanadate, titania-silica-tungsta-rare earth vanadates; and the second SCR catalytic active material is selected from the group of unexchanged, partly or completely metal exchanged ZSM-5, beta-, chabazite, ferrierite, mordenite, faujasite zeolites and combinations thereof.

In a still further embodiment the first SCR catalytic active material is selected from the group of the mixed metal oxide $CeO_2/ZrO_2/Nb_2O_5$; and the second SCR catalytic active material is selected from the group of unexchanged, partly or completely metal exchanged ZSM-5, beta-, chabazite, ferrierite, mordenite, faujasite zeolites and combinations thereof.

In a further embodiment the first SCR catalytic active material further contains a zeolite, such as a Fe-beta-zeolite.

In another aspect the present invention relates to a porous ceramic honeycomb filter comprising a porous ceramic substrate comprising a porous substrate support with a porosity of at least 50% v/v, wherein the porosity is measured by mercury intrusion porosimetry according to DIN 66133, which support further comprises a) a first non-uniform coating layer of an oxide component in contact with a surface of the substrate support, wherein the oxide component is selected from the group consisting of alumina, titania, silica, ceria, zirconia, niobium, praseodymium or mixtures thereof, which oxide component is distributed on the surface of the substrate support and in dead-end pores of the substrate support and creates the non-uniform coating layer on the substrate support, wherein the first coating layer has a substantially smooth surface, b) a second coating layer of a first SCR catalytic active material in direct contact with the smooth surface of the first coating layer, and c) a third coating layer of a second SCR catalytic active material in direct contact with the second coating layer.

In a further aspect the present invention relates to a system for purifying exhaust gasses selected from an exhaust and emission system having a porous ceramic honeycomb filter comprising a porous ceramic substrate comprising a porous substrate support with a porosity of at least 50% v/v, wherein the porosity is measured by mercury intrusion porosimetry according to DIN 66133, which support further comprises a) a first non-uniform coating layer of an oxide component in contact with a surface of the substrate support, wherein the oxide component is selected from the group consisting of alumina, titania, silica, ceria, zirconia, niobium, praseodymium or mixtures thereof, which oxide component is distributed on the surface of the substrate support and in dead-end pores of the substrate support and creates the non-uniform coating layer on the substrate support, wherein the first coating layer has a substantially smooth surface, b) a second coating layer of a first SCR catalytic active material in direct contact with the smooth surface of the first coating layer, and c) a third coating layer of a second SCR catalytic active material in direct contact with the second coating layer.

In a still further aspect the present invention relates to a process of making a porous ceramic substrate comprising a porous substrate support with a porosity of at least 50% v/v, wherein the porosity is measured by mercury intrusion porosimetry according to DIN 66133, which support further comprises a) a first non-uniform coating layer of an oxide component in contact with a surface of the substrate support, wherein the oxide component is selected from the group consisting of alumina, titania, silica, ceria, zirconia, niobium, praseodymium or mixtures thereof, which oxide component is distributed on the surface of the substrate support and in dead-end pores of the substrate support and creates the non-uniform coating layer on the substrate support, wherein the first coating layer has a substantially smooth surface, b) a second coating layer of a first SCR catalytic active material in direct contact with the smooth surface of the first coating layer, and c) a third coating layer of a second SCR catalytic active material in direct contact with the second coating layer, the process comprising a) applying the first coating layer of the oxide component in an amount sufficient to create a substantially smooth surface on the substrate and sufficient to distribute the oxide component in dead-end pores of the substrate support to create the non-uniform coating layer, b) applying the second coating layer of a first SCR catalytic active material directly on the smooth surface of the first coating layer in an amount sufficient to obtain a catalytic reductive effect of $NO_x$; and c) applying the third coating layer of a second SCR catalytic active material directly on the second coating layer of the first SCR catalytic active material in an amount sufficient to obtain a catalytic reductive effect of $NO_x$.

FURTHER EMBODIMENTS 1-38

1. A porous ceramic substrate for use as a particle filter, with a porosity of at least 50% v/v, which comprises a non-uniform coating layer of an oxide component, which oxide component is distributed on the surface and in dead-end pores of the ceramic substrate and creates the non-uniform coating layer on the substrate, wherein the coating layer has a substantially smooth surface.
2. The porous ceramic substrate of embodiment 1 wherein the oxide component consists of nano particles.
3. The porous ceramic substrate of embodiment 1 wherein the oxide component consists of amorphous substance.
4. The porous ceramic substrate of embodiment 1 wherein the oxide component consists of a mixture of nano particles and amorphous substance.
5. The porous ceramic substrate of any one of embodiments 1-4 wherein the oxide component is selected from a colloidal sol, such as selected from the group of silica, alumina and titania.
6. The porous ceramic substrate of any one of embodiments 1-4 wherein the oxide component is selected from a metal oxide, such as selected from the group of alumina and titania.
7. The porous ceramic substrate of any one of embodiments 1-6 wherein the oxide component is present in the amount per volume of 20-100 g/l, such as 40-100 g/l.
8. The porous ceramic substrate of any one of embodiments 1-7 wherein the oxide component is distributed on at least 80% of the surface of the substrate.
9. The porous ceramic substrate of embodiment 8 wherein the oxide component is distributed on the whole surface of the substrate.
10. The porous ceramic substrate according to any one of the previous embodiments 1-9, wherein the ceramic substrate comprises mullite or cordierite or a non-oxide inorganic silicon containing component, such as selected from the group of SiC and $Si_3N_4$.
11. The porous ceramic substrate according to any one of the previous embodiments 1-10, wherein the ceramic substrate consists essentially of SiC.
12. The porous ceramic substrate of embodiment 11 wherein the porous ceramic substrate is selected from a re-crystallized SiC, a reaction formed SiC, a silicon bonded SiSiC, a liquid phase sintered SiC, a Silicon nitride bonded SiC and an oxide ceramic bonded SiC.
13. The porous ceramic substrate according to any one of the previous embodiments 1-12, wherein the porosity is at least 60% v/v, such as at least 65%, and no more than 75%.
14. The porous ceramic substrate according to any one of the previous embodiments 1-13, wherein the particle filter is a DPF.
15. A porous ceramic substrate for use as a particle filter with a porosity of at least 50% v/v, which comprises a) a first non-uniform coating layer of an oxide component in contact with a surface of the ceramic substrate, which oxide component is distributed on the surface and in dead-end pores of the ceramic substrate and creates the non-uniform coating layer on the substrate, wherein the first coating layer has a substantially smooth surface and b) a second coating layer of a catalytic active material in direct contact with the smooth surface of the first coating layer.
16. The porous ceramic substrate of embodiment 15 wherein the oxide component consists of nano particles.
17. The porous ceramic substrate of embodiment 15 wherein the oxide component consists of amorphous substance.
18. The porous ceramic substrate of embodiment 15 wherein the oxide component consists of a mixture of nano particles and amorphous substance.
19. The porous ceramic substrate of any one of embodiments 15-18 wherein the oxide component is selected from a colloidal sol, such as selected from the group of silica, alumina and titania.
20. The porous ceramic substrate of any one of embodiments 15-18 wherein the oxide component is selected from a metal oxide, such as selected from the group of alumina and titania.
21. The porous ceramic substrate of any one of embodiments 15-20 wherein the oxide component is present in the amount per volume of 20-100 g/l, such as 40-100 g/l.
22. The porous ceramic substrate of any one of embodiments 15-21 wherein the oxide component is distributed on at least 80% of the surface of the substrate.
23. The porous ceramic substrate of embodiment 22 wherein the oxide component is distributed on the whole surface of the substrate.
24. The porous ceramic substrate according to any one of the previous embodiments 15-23, wherein the ceramic substrate comprises mullite or cordierite or a non-oxide inorganic silicon containing component, such as selected from the group of SiC and $Si_3N_4$.
25. The porous ceramic substrate according to any one of the previous embodiments 15-24, wherein the ceramic substrate consists essentially of SiC.
26. The porous ceramic substrate of embodiment 25 wherein the porous ceramic substrate is selected from a re-crystallized SiC, a reaction formed SiC, a silicon bonded SiSiC, a liquid phase sintered SiC, a Silicon nitride bonded SiC and an oxide ceramic bonded SiC.

27. The porous ceramic substrate according to any one of the previous embodiments 15-26, wherein the porosity is at least 60% v/v, such as at least 65%, and no more than 75%.
28. The porous ceramic substrate according to any one of the previous embodiments 15-27, wherein the particle filter is a DPF.
29. The porous ceramic substrate according to any one of the previous embodiments 15-28, wherein the catalytic active material is selected from a SCR catalyst.
30. The porous ceramic substrate according to any one of the previous embodiments 15-29, wherein the catalytic active material is present in an amount of 100 g/l or less, such as from 25-100 g/l, e.g. from 40 to 100 g/l.
31. The porous ceramic substrate according to any one of the previous embodiments 15-30, wherein the catalytic active material is selected from the group of unexchanged, partly or completely metal exchanged ZSM-5, beta-, chabazite, ferrierite, mordenite, faujasite zeolites and combinations thereof.
32. The porous ceramic substrate according to any one of the previous embodiments 15-30, wherein the catalytic active material is selected from the group of mixed metal oxides as consisting of at least two metal oxides from the group of transition or rare earth metals and combinations thereof.
33. The porous ceramic substrate according to any one of the previous embodiments 15-30, wherein the catalytic active material is selected from the group of vanadium oxide based coatings as vanadia, titania-vanadia, titania-tungsta-vanadia, titania-tungsta-rare earth vanadate, titania-silica-tungsta-rare earth vanadates.
34. The porous ceramic substrate according to any one of the previous embodiments 15-30, wherein the catalytic active material is selected from mixtures of mixed metal oxides and zeolites.
35. A porous ceramic honey comb filter comprising the porous ceramic substrate according to any one of the previous embodiments 1-34.
36. A system for purifying exhaust gasses selected from an exhaust and emission system having a porous ceramic honey comb filter comprising the porous ceramic substrate according to any one of the previous embodiments 1-34
37. A process of making a porous ceramic substrate according to any one of embodiments 1-14 comprising a) applying the coating layer of the oxide component in an amount sufficient to create a substantially smooth surface on the substrate and sufficient to distribute the oxide component in dead-end pores of the ceramic substrate to create the non-uniform coating layer.
38. A process of making a porous ceramic substrate according to any one of embodiments 15-34 comprising a) applying the first coating layer of the oxide component in an amount sufficient to create a substantially smooth surface on the substrate and sufficient to distribute the oxide component in dead-end pores of the ceramic substrate to create the non-uniform coating layer, and b) applying the second coating layer of a catalytic active material directly on the smooth surface of the first coating layer in an amount sufficient to obtain a catalytic reductive effect of $NO_x$.

The above embodiments should be seen as referring to any one of the aspects (such as 'ceramic substrate, 'ceramic honeycomb filter, 'use of ceramic substrate, 'process of making' or 'ceramic substrate for use') described herein as well as any one of the embodiments described herein unless it is specified that an embodiment relates to a certain aspect or aspects of the present invention.

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

The terms "a" and "an" and "the" and similar referents as used in the context of describing the invention are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also provide a corresponding approximate measurement, modified by "about," where appropriate).

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter recited in the aspects or claims presented herein to the maximum extent permitted by applicable law.

The present invention is further illustrated by the following examples which, however, are not to be construed as limiting the scope of protection. The features disclosed in the foregoing description and in the following examples may, both separately and in any combination thereof, be material for realizing the invention in diverse forms thereof.

EXAMPLES

The following example will demonstrate the effect of a colloidal silica sol on the mechanical strength of a porous silicon carbide.

For a 60 g/l $SiO_2$ sol coating on 1"×3" porous SiC test filters with a porosity of 65%±1% and a pore diameter of 20 µm±1 µm as SEMS layer the amount of $SiO_2$ sol needed is recalculated based on the solid content of the sol and the volume of the filter substrate. To this amount of $SiO_2$ sol some water might be added. The total wash coat amount should not extent the amount of water the filter substrate is able to soak up plus the solid weight of $SiO_2$. The filter substrate is finally dip-coated with this sol by soaking up half of the coating by every bottom side and dried in a drying chamber for 3 hours at 100° C. In case no second layer is applied the SEMS coated filter substrate is calcinated in a furnace at 500° C. for 3 hours.

Basic Example 1

A porous SiC with a porosity of 65%±1% and a pore diameter of 20 µm±1 µm was coated subsequently with different levels of a colloidal silica sol. The substrate support was built in form of a honeycomb structure with a cell density of 200 cpsi and wall thickness of 400 µm. The manufacturing process of this porous SiC material is described in the WO 2013/076045 A1. The impact of the silica sol layer/coating on porosity and pore size is shown in the FIG. 2.

Figure 3:
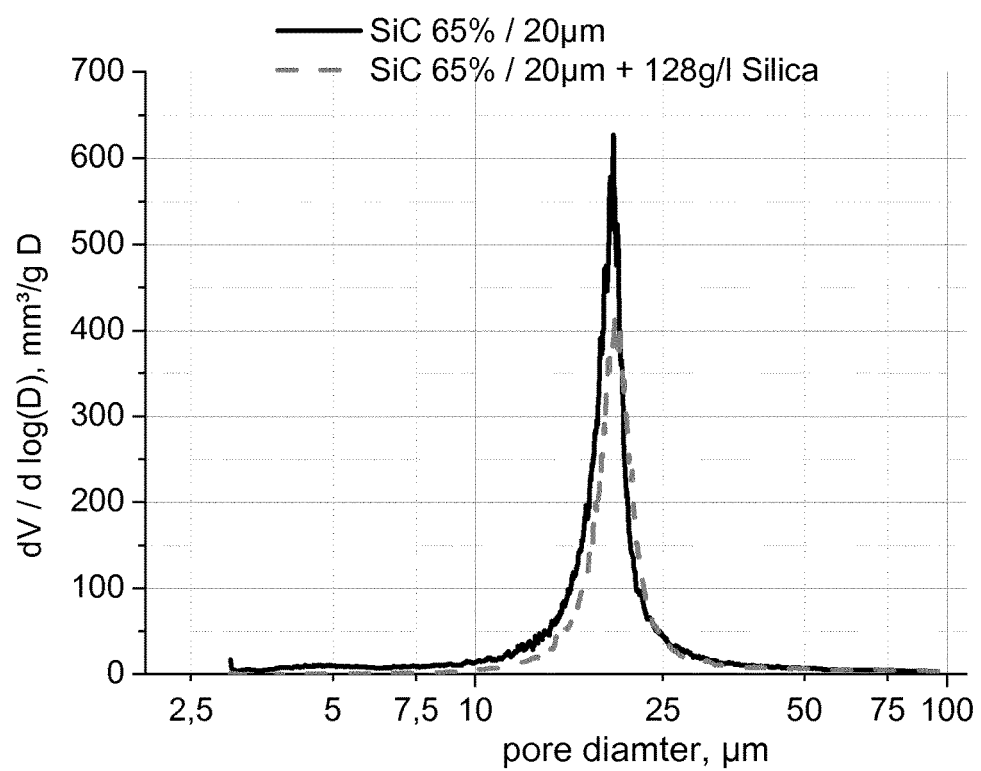
FIG. 3 shows for a coating with a sol the comparison of the pore size distribution measured by mercury intrusion porosimetry for the uncoated and coated structure.

The decrease of the porosity from initial 65% down to 57% at almost 180 g/l loading can be observed. The mean pore diameter is kept constant. This characteristic of the coating with a sol can be seen by the comparison of the pore size distribution measured by mercury intrusion porosimetry for the uncoated and coated structure. FIG. 3 shows such a comparison. The very small pores are filled with the coating and the overall accessible porosity is decreasing, but the median pore diameter remains the same.

Figure 4:
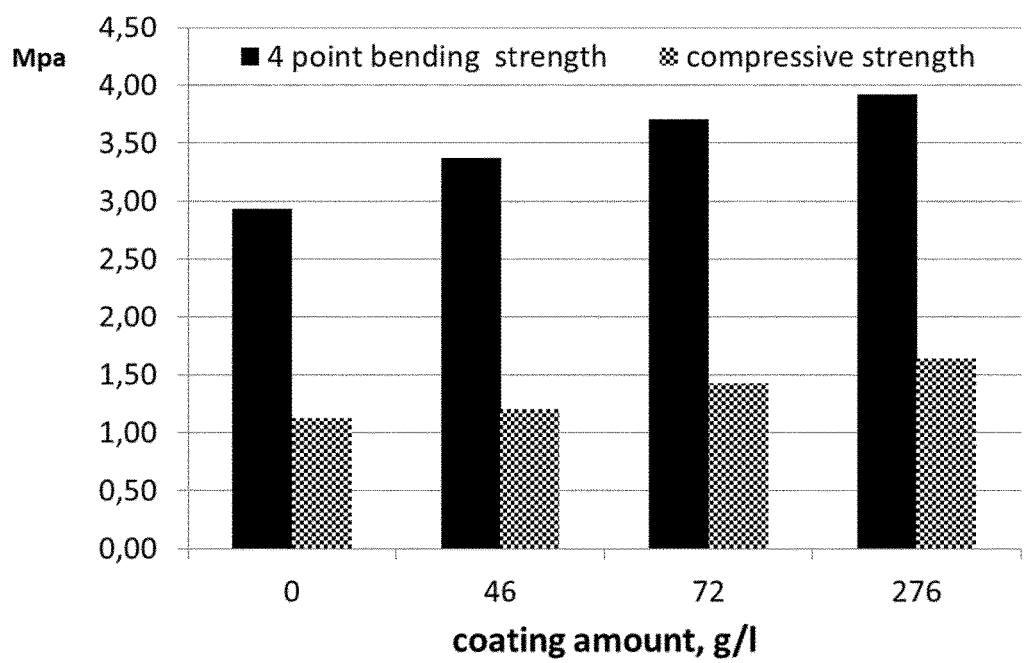
FIG. 4 shows the mechanical strength as tested with two methods: 4-point bending and compressive strength.

The mechanical strength was tested with two methods: 4-point bending and compressive strength. The results are shown in FIG. 4: The increase of the values can clearly be seen.

In the following it is described, how this initial SEMS layer will be combined with a second layer of a catalytic functional material. The surprising effect, which was found by the inventors during the development of this product, is that the initial SEMS layer has also a positive effect on the functionality of the second layer. It was found out, that a SEMS layer as an initial coating layer allows the reduction of the amount of the catalytic active catalyst material.

The basic example 1 is the starting point for a number of examples according to the intention of this invention.

The following examples will demonstrate the integration of SCR functionality into a porous silicon carbide structure in combination with a SEMS coating. They also show that the SEMS coating can be used to improve the functionality of the SCR coating and to reduce the overall needed amount of this type of catalysts, which are known to be expensive materials.

Example 2

The basic substrate was a porous SiC support with a porosity of 65%. The size was cylindrical with a diameter of 1 inch and a length of 3 inch. Each second channel was plugged on each side in a way that a wall flow filter was created. The initial coating on this filter sample was done in the same way as described in example 1 with a colloidal silica sol at a level of 60 g/l. For such a coating on a 1"×3" porous SiC test filter the amount of $SiO_2$ sol needed was recalculated based on the solid content of the sol and the volume of the filter substrate. To this amount of $SiO_2$ sol some water might be added. The total wash coat amount should not extent the amount of water the filter substrate is able to soak up plus the solid weight of $SiO_2$. The filter substrate was finally dip-coated with this sol by soaking up half of the coating by every bottom side and dried in a drying chamber for 3 hours at 100° C.

The second coating layer was a Fe-β-zeolite at a coating level of 65 g/l. For this purpose a commercial Fe-β-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Fe-β-zeolite coating was recalculated based on the solid content of the dispersion and the volume of the filter substrate. To this amount of Fe-β-zeolite dispersion some water might be added. The total wash coat amount should not extent the amount of water the filter substrate is able to soak up plus the solid weight of Fe-β-zeolite. The filter substrate was finally dip-coated with this dispersion by soaking up half of the coating by every bottom side and dried in a drying chamber for 3 hours at 100° C. As a final step the substrate support was calcinated in a furnace at 500° C. for 3 hours.

Comparative Example 3

The same wall flow filter as use in example 2 was used, but instead of applying first a SEMS layer, a Fe-β-zeolite was coated direct on the substrate at an amount of 60 g/l. For this purpose a commercial Fe-β-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Fe-β-zeolite coating was recalculated based on the solid dispersion and the volume of the filter substrate. To this amount of Fe-β-zeolite dispersion some water might be added. The total wash coat amount should not extent the amount of water the filter substrate is able to soak up plus the solid weight of Fe-β-zeolite. The filter substrate was finally dip-coated with this dispersion by soaking up half of the coating by every bottom side and dried in a drying chamber for 3 hours at 100° C. As a final step the substrate was calcinated in a furnace at 500° C. for 3 hours.

Comparative Example 4

The same wall flow filter as use in example 2 was used, but instead of applying first a SEMS layer, a Fe-β-zeolite was coated direct on the substrate at an amount of 120 g/l. For this purpose a commercial Fe-β-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Fe-β-zeolite coating was recalculated based on the solid content of the dispersion and the volume of the filter substrate. To this amount of Fe-β-zeolite dispersion some water might be added. The total wash coat amount should not extent the amount of water the filter substrate is able to soak up plus the solid weight of Fe-β-zeolite. The filter substrate was finally dip-coated with this dispersion by soaking up half of the coating by every bottom side and dried in a drying chamber for 3 hours at 100° C. As a final step the substrate support was calcinated in a furnace at 500° C. for 3 hours.

Comparative Example 5

A cordierite substrate with a cell density of 400 cpsi, a cell wall thickness of 130 µm and a porosity of 35% was coated with 120 g/l the same Fe-β-zeolite as used in examples 2 and 3. For this purpose a commercial Fe-β-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Fe-β-zeolite coating was recalculated based on the solid content of the dispersion and the volume of the cordierite substrate. To this amount of Fe-β-zeolite dispersion some water might be added. The total wash coat amount should not extent the amount of water the substrate is able to soak up plus the solid weight of Fe-β-zeolite. The cordierite substrate was finally dip-coated with this sol by soaking up half of the coating by every bottom side and dried in a drying chamber for 3 hours at 100° C. As a final step the substrate was calcinated in a furnace at 500° C. for 3 hours. The channels of this cordierite substrate were not plugged, i.e. it is a flow through catalyst and not a wall flow filter.

All four examples which contain the Fe-β-zeolite as one catalytic component are listed in table 1

TABLE 1

| example | Substrate | SEMS | Catalyst |
|---|---|---|---|
| #2 | SIC wall flow, 65%, 20 µm | 60 g/l SiO$_2$ | 65 g/l Fe-β-zeolite |
| #3, comparative | SiC wall flow, 65%, 20 µm | — | 60 g/l Fe-β-zeolite |
| #4, comparative | SiC wall flow, 65%, 20 µm | — | 120 g/l Fe-β-zeolite |
| #5, comparative | Cordierite, flow through | — | 120 g/l Fe-β-zeolite |

Examples 2-5 have been tested due to their SCR performance in a laboratory flow reactor. The corresponding test parameters are given below.
  Main gas flow: pressurized air
  NO concentration: 250 ppm
  NO$_2$ concentration: 250 ppm
  NH$_3$ concentration: 500 ppm
  Water content: 10%
  Space velocity: 33000/h
  Temperature range: 200-450° C.

The results for the SCR efficiency for the four examples in the temperature range from 200° C. up to 450° C. are plotted in the diagram in FIG. 5. It can clearly be seen, that the presence of the first coating layer allows a reduction of the catalytic active material. Comparative example 5 represents the solution due to the state of the art, i.e. a coated flow through cordierite. Comparative example 4 represents the solution with the same amount of catalyst on a filter in the same volume. The effect of reduction of the catalyst to the half amount can be seen in the result for comparative example 3. The SCR efficiency is the same or even slightly better in the temperature range between 240° C. and 320° C., but in the high temperature region, the SCR efficiency is reduced. In example 2, the same amount of catalyst is now coated on an initial SiO$_2$ layer and the result is that the SCR efficiency in the high temperature region is as good as for the high catalyst load. The result for example 2 is even better in the low temperature region as for all three comparative examples.

In the following, mixed oxides based on ceria and zirconia with different dopants and in different grain sizes as the only catalyst component and in combination with a Fe-β-zeolite have been used to prepare a set of comparative examples and two new examples according to this invention.

Example 6: SEMS Based on a Nano Slurry

The basic substrate was again a wall flow filter based on a porous SiC support with a porosity of 65%. On this substrate support a nano slurry based on a mixed oxide with the composition CeO$_2$/ZrO$_2$/Nb$_2$O$_5$ (18.0/72.0/10.0 weight-%) with a mean particle diameter of 0.5 µm was coated. The amount of this nano slurry on the filter was 60 g/l. For such a coating as the initial SEMS layer the amount of ceria/zirconia based nano slurry needed was recalculated based on the solid content of the sol and the volume of the filter substrate. To this amount of nano slurry some water might be added. The total wash coat amount should not extent the amount of water the filter substrate is able to soak up plus the solid weight of mixed metal oxide. The filter substrate was then dip-coated with this nano slurry by soaking up half of the coating by every bottom side and dried in a drying chamber for 3 hours at 100° C. As a final step substrate support was calcinated in a furnace at 500° C. for 3 hours. The effect of improvement of the mechanical strength was the same as for the corresponding amount of colloidal silica sol as described in example 1.

This first coating layer has also a given SCR efficiency which has been measured in the same way as for examples 2-5. The result is plotted in FIG. 6.

Comparative Example 7

The basic substrate was again a wall flow filter based on a porous SiC support with a porosity of 65%. On this substrate support a catalyst layer based on a mixed oxide with the composition CeO$_2$/ZrO$_2$/Nb$_2$O$_5$ (18.0/72.0/10.0 weight %) with a mean particle diameter of 1.5 µm was coated. For a 130 g/l coating on a 1"×3" test filter the amount of ceria/zirconia based powder needed was recalculated based on the volume of the filter substrate support. In this special case 5.018 g of this powder have been dispersed in water together with a dispersant. The total wash coat amount should not extent the amount of water the filter substrate is able to soak up plus the solid weight of ceria/zirconia powder. The filter substrate was then dip-coated with this dispersion by soaking up half of the coating by every bottom side and dried in a drying chamber for 3 hours at 100° C. As a final step the substrate support was calcinated in a furnace at 500° C. for 3 hours. The SCR efficiency of this sample was also measured and the results are plotted in FIG. 6.

Comparative Example 8

The basic substrate was again a wall flow filter based on a porous SiC support with a porosity of 65%. On this substrate support a catalyst layer based on a mixture of a mixed metal oxide with the composition CeO$_2$/ZrO$_2$/Nb$_2$O$_5$ (18.0/72.0/10.0 weight %) with a mean particle diameter of 1.5 μm and a Fe-β-zeolite with the mean particle diameter of 0.39 μm was coated. The amount of zeolite was 50 g/l as well as the amount of mixed metal oxide. For a 50 g/l coating the amount of ceria/zirconia based powder needed was recalculated based on the volume of the filter substrate. In this special case 1.930 g of this powder have been dispersed in water together with a dispersant. The total wash coat amount should not extent the amount of water the filter substrate is able to soak up plus the solid weight of ceria/zirconia powder. The filter substrate was then dip-coated with this dispersion by soaking up half of the coating by every bottom side and dried in a drying chamber for 3 hours at 100° C. For the second 50 g/l coating layer a commercial Fe-β-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Fe-β-zeolite coating was recalculated based on the solid content of the dispersion and the volume of the filter substrate. To this amount of Fe-β-zeolite dispersion some water might be added. The total wash coat amount should not extent the amount of water the substrate is able to soak up plus the solid weight of Fe-β-zeolite. The filter substrate was finally dip-coated with the dispersion by soaking up half of the coating by every bottom side and dried in a drying chamber for 3 hours at 100° C. As a final step the substrate support was calcinated in a furnace at 500° C. for 3 hours. The SCR efficiency of this sample was also measured and the result is plotted in FIG. 6.

Example 9

The basic substrate was again a wall flow filter based on a porous SiC support with a porosity of 65% and the initial coating was done in the same way as described in comparative example 6, but in this case with a mixed oxide with the composition $CeO_2/ZrO_2/Nd_2O_3/Pr_6O_{11}$ (20.0/57.6/2.4/20.0 weight % amounts) with a mean particle diameter of 0.5 μm. The second coating layer was done with Fe-β-zeolite particles with a mean particle diameter of 0.39 μm. The amount of zeolite as well as of mixed metal oxide was 55 g/l. For the initial coating the amount of ceria/zirconia based nano slurry needed was recalculated based on the solid content of the sol and the volume of the filter substrate. To this amount of nano slurry some water might be added. The total wash coat amount should not extent the amount of water the filter substrate is able to soak up plus the solid weight of mixed metal oxide. The filter substrate was then dip-coated with this nano slurry by soaking up half of the coating by every bottom side and dried in a drying chamber for 3 hours at 100° C. For the second 55 g/l coating layer a commercial Fe-β-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Fe-β-zeolite coating was recalculated based on the solid content of the dispersion and the volume of the filter substrate. To this amount of Fe-β-zeolite dispersion some water might be added. The total wash coat amount should not extent the amount of water the substrate is able to soak up plus the solid weight of Fe-β-zeolite. The filter substrate was finally dip-coated with the dispersion by soaking up half of the coating by every bottom side and dried in a drying chamber for 3 hours at 100° C. As a final step the substrate support was calcinated in a furnace at 500° C. for 3 hours. The SCR efficiency of this sample was also measured and the result is plotted in FIG. 6.

A summary of example 6-9 is given in table 2.

TABLE 2

| Example | Substrate | SEMS | Catalyst |
|---|---|---|---|
| #8 | SiC wall flow, 65%, 20 μm | 160 g/l $CeO_2/ZrO_2/Nb_2O_4$ | — |
| #7, comparative | SiC wall flow, 65%, 20 μm | — | 130 g/l $CeO_2/ZrO_2/Nb_2O_5$ |
| #8, comparative | SiC wall flow, 65%, 20 μm | — | 50 g/l $CeO_2/ZrO_2/Nb_2O_5$ 50 g/l Fe-β-zeolite |
| #9, | SiC wall flow, 65%, 20 μm | 55 g/l $CeO_2/ZrO_2/$ $Nd_2O_3/Pr_6O_{11}$ | 55 g/l Fe-β-zeolite |

The results for comparative example 3 are also plotted in FIG. 6. One can see that the first coating layer in form of a nano slurry as given in example 6 also shows a slight SCR performance. It is known that mixed metal oxides based on ceria and zirconia has this characteristic feature, but as the results show, the performance is not very good. In comparative example 7, the same type of mixed oxide was coated on the filter as a powder. This sample does not show any mechanical improvement compared to the uncoated filter. But the SCR performance is much better, however, it does not reach the same level as for the Fe-β-zeolite. This example demonstrates that the powder inside the channel walls has a much higher active surface area than the dense sintered layer of example 6. It is known (see results of WO2013060487A1, mentioned in the introduction), that mixtures of powders of this type of materials with powders of a Fe-β-zeolite will lead to a very good SCR catalytic activity. This is verified with comparative example 8. This SCR coated filter shows a nearly perfect performance over the whole temperature range. The disadvantage of this special powder mixture is that the back pressure increase is very high in comparison to the single powders as a coating. This is demonstrated by table 3, which shows for examples 2-4 and 6-9 the impact of the different coatings on the porosity, mean pore diameter and the back pressure at 50 l/min air flow through the lab sample size of 1"×3".

TABLE 3 porosity, pore size and back pressure impact at 50 l/min air flow for the tested samples

| | Porosity, % | Mean pore diameter, μm | Back pressure impact |
|---|---|---|---|
| not coated | 65 | 20 | — |
| Example 2 | 55 | 18 | 17% |
| Example 3 | 59 | 19 | 23% |
| Example 4 | 56 | 18 | 35% |
| Example 6 | 60 | 18 | 26% |
| Example 7 | 61 | 19 | 10% |
| Example 8 | 47 | 17 | 58% |
| Example 9 | 52 | 18 | 50% |

The result for example 9 demonstrate, that this perfect performance can be achieved, if such a mixed oxide powder is already used for the initial SEMS layer, i.e. the first coating layer is based on a mixture with ceria and zirconia. In contrast to comparative example 8, this solution has a higher mechanical strength and a lower back pressure.

The examples 10 to 12 demonstrate this for a SCR catalyst based in a vanadia-titania composition.

Example 10

The same type of SiC wall flow filter element as in the previous examples was used and similar to the examples 2 and 3 a SEMS layer was applied at an amount of 60 g/l. On this layer, a SCR catalyst based on a titania-vanadia composition with an amount of 65 g/l was coated. The amount of $V_2O_2$ in the SCR composition was 4 weight-%. For the initial 60 g/l $SiO_2$ sol coating the amount of $SiO_2$ sol needed was recalculated based on the solid content of the sol and the volume of the filter substrate. To this amount of $SiO_2$ sol some water might be added. The total wash coat amount should not extent the amount of water the filter substrate is able to soak up plus the solid weight of $SiO_2$. The filter substrate was finally dip-coated with this sol by soaking up half of the coating by every bottom side and dried in a drying chamber for 3 hours at 100° C. The second coating layer of 65 g/l titania-vanadia was applied. For this purpose vanadyl oxalate was used as the vanadia precursor. The amount needed was recalculated based on the solid content of the vanadyl oxalate solution, the total wash coat loading of the second layer and the volume of the filter substrate. The precursor was then added to the titania of which the amount needed was recalculated likewise. To this mixture some water might be added. The total wash coat amount should not extent the amount of water the filter substrate is able to soak up plus the solid weight of titania-vanadia. The filter substrate was then dip-coated with this dispersion by soaking up half of the coating by every bottom side and dried in a drying chamber for 3 hours at 100° C. As the final step the substrate support was calcinated in a furnace 500° C. for 3 hours.

Comparative Example 11

The same wall flow filter as in example 6 was used, but instead of applying first a SEMS layer, titania-vanadia composition with 4 weight-% $V_2O_5$ was coated direct on the substrate at an amount of 115 g/l. For this purpose vanadyl oxalate was used as the vanadia precursor. The amount needed was recalculated based on the solid content of the vanadyl oxalate solution, the total wash coat loading and the volume of the filter substrate. The precursor was then added to the titania of which the amount needed was recalculated likewise. To this mixture some water might be added. The total wash coat amount should not extent the amount of water the filter substrate is able to soak up plus the solid weight of titania-vanadia. The filter substrate was then dip-coated with this dispersion by soaking up half of the coating by every bottom side and dried in a drying chamber for 3 hours at 100° C. As the final step the substrate support was calcinated in a furnace 500° C. for 3 hours.

Comparative Example 12

The same wall flow filter as in example 6 was used, but instead of applying first a SEMS layer, titania-vanadia composition with 4 weight-% $V_2O_5$ was coated direct on the substrate at an amount of 65 g/l. For this purpose vanadyl oxalate was used as the vanadia precursor. The amount needed was recalculated based on the solid content of the vanadyl oxalate solution, the total wash coat loading and the volume of the filter substrate. The precursor was then added to the titania of which the amount needed was recalculated likewise. To this mixture some water might be added. The total wash coat amount should not extent the amount of water the filter substrate is able to soak up plus the solid weight of titania-vanadia. The filter substrate was then dip-coated with this dispersion by soaking up half of the coating by every bottom side and dried in a drying chamber for 3 hours at 100° C. As the final step the substrate support was calcinated in a furnace 500° C. for 3 hours.

The data of all three examples based on vandia as the SCR catalyst are listed in table 4.

TABLE 4

| Example | Substrate | SEMS | Catalyst |
| --- | --- | --- | --- |
| #10 | SiC wall flow, 65%, 20 μm | 60 g/l $SiO_2$ | 65 g/l titania/4% vanadia |
| #11, comparative | SiC wall flow, 65%, 20 μm | — | 115 g/l titania/4% vanadia |
| #12, comparative | SiC wall flow, 65%, 20 μm | — | 65 g/l titania/4% vanadia |

In the same way as the previous examples the examples 10-12 have been tested in the lab flow reactor to check their SCR performance. The corresponding curves are plotted in FIG. 7. The comparison of the two comparative examples 11 and 12 show that the reduction from 115 g/l to 65 g/l has led to a significant reduction in the SCR performance. But the data for example 10 clearly demonstrate, that the initial coating with the SEMS layer leads to a much better SCR performance in comparison to comparative example 12.

Example 13

The basic substrate was a porous SiC support with a porosity of 65%. The size was cylindrical with a diameter of 1 inch and a length of 3 inch. Each second channel was plugged on each side in a way that a wall flow filter was created. The initial coating on this filter sample was done in the same way as described in example 1 with a colloidal silica sol at a level of 60 g/l. For such a coating on a 1"×3" porous SiC test filter the amount of $SiO_2$ sol needed was recalculated based on the solid content of the sol and the volume of the filter substrate. To this amount of $SiO_2$ sol some water might be added. The total wash coat amount should not extent the amount of water the filter substrate is able to soak up plus the solid weight of $SiO_2$. The filter substrate was finally dip-coated with this sol by soaking up half of the coating by every bottom side and dried in a drying chamber for 3 hours at 100° C.

The second coating layer was a Cu-ZSM-5-zeolite at a coating level of 60 g/l. For this purpose a commercial Cu-ZSM-5-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Cu-ZSM-5-zeolite coating was recalculated based on the solid content of the dispersion and the volume of the filter substrate. To this amount of Cu-ZSM-5-zeolite dispersion some water might be added. The total wash coat amount should not extent the amount of water the filter substrate is able to soak up plus the solid weight of Cu-ZSM-5-zeolite. The filter substrate was finally dip-coated with this dispersion by soaking up half of the coating by every bottom side and dried in a drying chamber for 3 hours at 100° C. As a final step the substrate support was calcinated in a furnace at 500° C. for 3 hours.

Comparative Example 14

The same wall flow filter as use in example 13 was used, but instead of applying first a SEMS layer, a Cu-ZSM-5- zeolite was coated directly on the substrate at an amount of 120 g/l. For this purpose a commercial Cu-ZSM-5-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Cu-ZSM-5-zeolite coating was recalculated based on the solid content of the dispersion and the volume of the filter substrate. To this amount of Cu-ZSM-5-zeolite dispersion some water might be added. The total wash coat amount should not extent the amount of water the filter substrate is able to soak up plus the solid weight of Cu-ZSM-5-zeolite. The filter substrate was finally dip-coated with this dispersion by soaking up half of the coating by every bottom side and dried in a drying chamber for 3 hours at 100° C. As a final step the substrate support was calcinated in a furnace at 500° C. for 3 hours.

Example 15

The basic substrate was a porous SiC support with a porosity of 65%. The size was cylindrical with a diameter of 1 inch and a length of 3 inch. Each second channel was plugged on each side in a way that a wall flow filter was created. The initial coating on this filter sample was done in the same way as described in example 1 with a colloidal silica sol at a level of 20 g/l. For such a coating on a 1"×3" porous SiC test filter the amount of $SiO_2$ sol needed was recalculated based on the solid content of the sol and the volume of the filter substrate. To this amount of $SiO_2$ sol some water might be added. The total wash coat amount should not extent the amount of water the filter substrate is able to soak up plus the solid weight of $SiO_2$. The filter substrate was finally dip-coated with this sol by soaking up half of the coating by every bottom side and dried in a drying chamber for 3 hours at 100° C.

In close contact to the $SiO_2$ a layer based on a mixed oxide with the composition $CeO_2/ZrO_2/Nb_2O_5$ (18.0/72.0/10.0 weight %) with a mean particle diameter of 1.5 μm was coated. For a 40 g/l coating on a 1"×3" test filter the amount of ceria/zirconia based powder needed was recalculated based on the volume of the filter substrate. In this special case 1.544 g of this powder have been dispersed in water together with a dispersant. The total wash coat amount should not extent the amount of water the filter substrate is able to soak up plus the solid weight of ceria/zirconia powder. The filter substrate was then dip-coated with this dispersion by soaking up half of the coating by every bottom side and dried in a drying chamber for 3 hours at 100° C.

The top coating layer was a Cu-ZSM-5-zeolite at a coating level of 60 g/l. For this purpose a commercial Cu-ZSM-5-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Cu-ZSM-5-zeolite coating was recalculated based on the solid content of the dispersion and the volume of the filter substrate. To this amount of Cu-ZSM-5-zeolite dispersion some water might be added. The total wash coat amount should not extent the amount of water the filter substrate is able to soak up plus the solid weight of Cu-ZSM-5-zeolite. The filter substrate was finally dip-coated with this dispersion by soaking up half of the coating by every bottom side and dried in a drying chamber for 3 hours at 100° C. As a final step the substrate support was calcinated in a furnace at 500° C. for 3 hours.

Example 16

The same type of SiC wall flow filter element as in the previous examples was used and a SEMS layer was applied at an amount of 30 g/l. In close contact of this layer a mixed oxide with the composition $CeO_2/ZrO_2/Nb_2O_5$ (18.0/72.0/10.0 weight %) with a mean particle diameter of 1.5 μm was coated. For a 60 g/l coating on a 1"×3" test filter the amount of ceria/zirconia based powder needed was recalculated based on the volume of the filter substrate. In this special case 2.316 g of this powder have been dispersed in water together with a dispersant. The total wash coat amount should not extent the amount of water the filter substrate is able to soak up plus the solid weight of ceria/zirconia powder. The filter substrate was then dip-coated with this dispersion by soaking up half of the coating by every bottom side and dried in a drying chamber for 3 hours at 100° C.

On top of that a layer of Cu-ZSM-5-zeolite at a coating level of 30 g/l was applied. For this purpose a commercial Cu-ZSM-5-zeolite was milled. Therefore a dispersant and water was added to reach a solid content of the zeolite between 30 wt % and 35 wt %. The mixture was run for 4 hours at a ball mill. The dispersion was finally sieved and the solid content determined. The amount of Cu-ZSM-5-zeolite coating was recalculated based on the solid content of the dispersion and the volume of the filter substrate. To this amount of Cu-ZSM-5-zeolite dispersion some water might be added. The total wash coat amount should not extent the amount of water the filter substrate is able to soak up plus the solid weight of Cu-ZSM-5-zeolite. The filter substrate was finally dip-coated with this dispersion by soaking up half of the coating by every bottom side and dried in a drying chamber for 3 hours at 100° C. As a final step the substrate support was calcinated in a furnace at 500° C. for 3 hours.

The data for the examples 13-16 with Cu-zeolites are summarized in table 5:

TABLE 5

| Example | Substrate | SEMS | Catalyst |
| --- | --- | --- | --- |
| #13 | SiC wall flow, 65%, 20 μm | 60 g/l $SiO_2$ | 60 g/l Cu-ZSM-5 |
| #14 comparative | SiC wall flow, 65%, 20 μm | — | 120 g/l Cu-ZSM-5 |
| #15 | SIC wall flow, 65%, 20 μm | 20 g/l $SiO_2$ | 40 g/l $CeO_2/ZrO_2/Nb_2O_5$ 60 g/l Cu-ZSM-5 |
| #16 | SiC wall flow, 65%, 20 μm | 30 g/l $SiO_2$ | 60 g/l $CeO_2/ZrO_2/Nb_2O_5$ 30 g/l Cu-ZSM-5 |

The impact on the porosity and the mean pore diameter and the resulting effect on the back pressure for these two examples are listed in table 6.

TABLE 6

| porosity, pore size and back pressure impact at 50 l/min air flow for the tested samples 13-16 | | | |
| --- | --- | --- | --- |
| | Porosity, % | Mean pore diameter, μm | Back pressure impact |
| Example 13 | 54 | 18 | 18% |
| Example 14 | 53 | 17 | 45% |
| Example 15 | 48 | 18 | 22% |
| Example 16 | 55 | 19 | 16% |

Examples 13-16 have been tested due to their SCR performance in the same laboratory flow reactor under the same test conditions as described for examples 3-5. The results are shown in FIG. 8.

The direct comparison of the results of example 13 and 14 clearly show, that the first $SiO_2$ layer, which fills up the small dead end pores on the pore wall surface and which smooth the surface of the substrate support, allows the reduction of the Cu-ZSM-5 zeolite from 120 g/l to 60 g/l without losing any SCR efficiency. In the temperature range from 220° C. to 280° C. the efficiency is even better.

Figure 2:
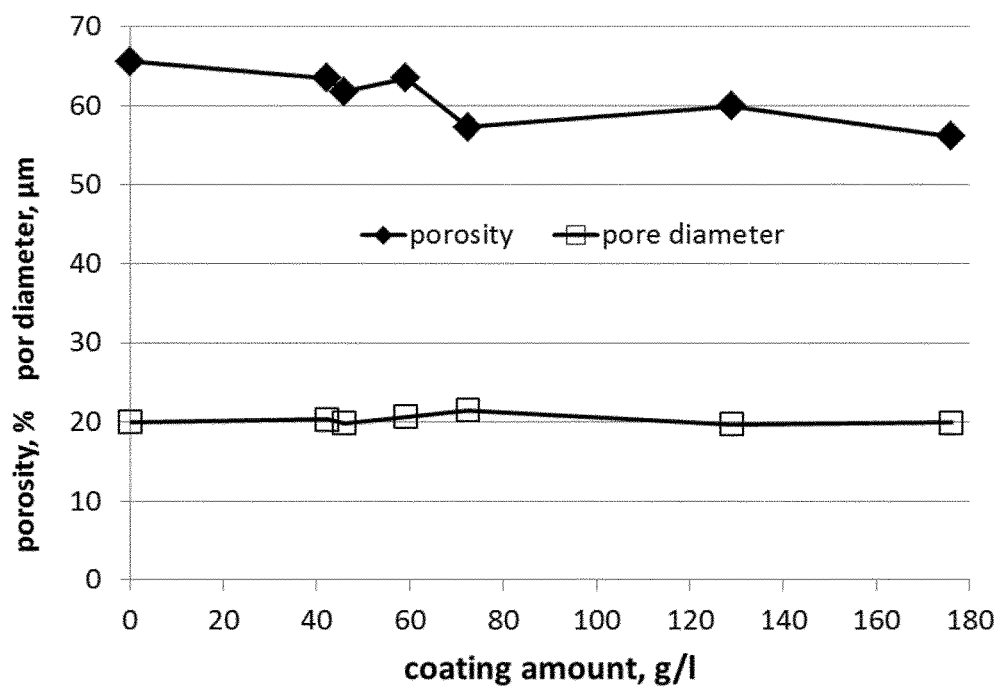
FIG. 2 shows the effect of increasing coating layers on porosity and pore diameter.

Examples 15 and 16 represent a three layer coating, in which the initial oxide layer is reduced to an amount of only 40 g/l and 30 g/l respectively. As shown in FIGS. 2 and 4, the low loadings have only a very low impact on the porosity but lead already to an increase of the mechanical strength. On this initial oxide layer a two layer coating analogue to example 9 was applied. The ratio between the mixed metal oxide $CeO_2/ZrO_2/Nb_2O_5$ and the Cu-ZSM 5 zeolite was varied in these two examples.

In example 15 the amount of 60 g/l for the Cu-ZSM-5 was kept in comparison to example 13, but the initial oxide layer was reduced to 20 g/l to insert a third intermediate layer of the mixed metal oxide, which is known from examples 5-9 to have also a SCR functionality. The comparison of the result of example 15 to 13 shows, that this third intermediate layer improves again the total SCR performance of the filter.

In example 16 the Cu-ZSM-5 zeolite was in comparison to example 15 reduced to a very low amount of only 30 g/l and the first oxide layer was increased to 30 g/l and the intermediate mixed metal oxide layer was increased to 60 g/l. The corresponding result shown in FIG. 8 demonstrates, that this design leads also to a very high SCR efficiency which is almost as good as for example 15. This example should demonstrate that it is possible to create with a three layer design based on the initial oxide layer and subsequent two layers of SCR catalysts a filter with a high SCR functionality at a low loading amount of the very expensive Cu-ZSM 5 zeolite.

We claim:

1. A porous ceramic substrate comprising:
a porous substrate support with a porosity of at least 50% v/v, wherein the porosity is measured by mercury intrusion porosimetry according to DIN 66133, which support further comprises
a) a first non-uniform coating layer of an oxide component in contact with a surface of the substrate support, wherein the oxide component is selected from alumina, titania, silica, ceria, zirconia, niobium oxide, praseodymium oxide or mixtures thereof, which oxide component is distributed on the surface of the substrate support and in dead-end pores of the substrate support and creates the non-uniform coating layer on the substrate support, wherein the first coating layer has a smooth surface and
b) a second coating layer of an ammonia-SCR catalytic active material in direct contact with the smooth surface of the first coating layer;
wherein the ammonia-SCR catalytic active material is capable of SCR reactions; with the proviso that:
the porous ceramic substrate comprises at least 65 g of the ammonia-SCR catalytic active material per liter of substrate; or
the ammonia-SCR catalytic active material comprises a partly or completely metal exchanged zeolite, where the metal is Cu or Fe.

2. The porous ceramic substrate of claim 1, wherein the oxide component includes nano particles having a mean diameter in the range from 1 nm to 900 nm.

3. The porous ceramic substrate of claim 1, wherein the oxide component is present in the amount per volume of 20-100 grams of oxide component/liter of substrate.

4. The porous ceramic substrate of claim 1, wherein the oxide component is distributed on at least 80% of the whole surface of the substrate support and in dead-end pores of the substrate support.

5. The porous ceramic substrate of claim 4, wherein the oxide component is distributed on the whole surface of the substrate support and in dead-end pores of the substrate support.

6. The porous ceramic substrate according to claim 1, wherein the porous substrate support comprises mullite or cordierite or a non-oxide inorganic silicon containing component.

7. The porous ceramic substrate according to claim 1, wherein the porous substrate support includes SiC.

8. The porous ceramic substrate according to claim 1, wherein the porosity of the ceramic substrate support is at least 60%.

9. The porous ceramic substrate according to claim 1, wherein the ammonia-SCR catalytic active material is present in an amount of from 65-120 grams of ammonia-SCR catalytic active material/liter of substrate.

10. The porous ceramic substrate according to claim 1, wherein the porous ceramic substrate comprises at least 65 g of the ammonia-SCR catalytic active material per liter of substrate.

11. The porous ceramic substrate according to claim 1, wherein the ammonia-SCR catalytic active material comprises a partly or completely metal exchanged zeolite, wherein the metal is Cu or Fe.

12. The porous ceramic substrate according to claim 11, wherein the partly or completely metal exchanged zeolite is selected from the group consisting of partly or completely metal exchanged: ZSM-5; beta-; chabazite; ferrierite; mordenite; faijasite zeolites and combinations thereof.

13. A porous ceramic honeycomb filter comprising the porous ceramic substrate according to claim 1.

14. A system for purifying exhaust gasses selected from an exhaust and emission system having a porous ceramic honeycomb filter comprising the porous ceramic substrate according to claim 1.

15. A process of making a porous ceramic substrate according to claim 1, comprising a) applying the first coating layer of the oxide component in an amount sufficient to create a smooth surface on the substrate support and sufficient to distribute the oxide component in dead-end pores of the substrate support to create the non-uniform coating layer, and b) applying the second coating layer of a SCR catalytic active material directly on the smooth surface of the first coating layer in an amount sufficient to obtain a SCR catalytic reductive effect of $NO_x$.

* * * * *